United States Patent [19]
Charransol et al.

[11] 4,093,827
[45] June 6, 1978

[54] SYMMETRICAL TIME DIVISION MATRIX AND A NETWORK EQUIPPED WITH THIS KIND OF MATRIX

[75] Inventors: Pierre Charransol; Jacques Hauri; Claude Athènes, all of Paris, France

[73] Assignee: Thomson-CSF, Paris, France

[21] Appl. No.: 768,632

[22] Filed: Feb. 14, 1977

[30] Foreign Application Priority Data
Feb. 17, 1976 France .............................. 76 04345
Apr. 9, 1976 France .............................. 76 10566

[51] Int. Cl.² ........................................... H04Q 11/04
[52] U.S. Cl. ........................... 179/15 AT; 179/18 GF
[58] Field of Search ........ 179/15 AT, 15 AQ, 18 GF

[56] References Cited
U.S. PATENT DOCUMENTS

| | | | |
|---|---|---|---|
| 3,597,548 | 8/1971 | Drinnan | 179/15 AT |
| 3,735,049 | 5/1973 | Buchner | 179/15 AQ |
| 3,801,746 | 4/1974 | Buchner | 179/15 AT |
| 3,956,593 | 5/1976 | Collins | 179/15 AT |
| 4,009,349 | 2/1977 | Belforte | 179/15 AT |

*Primary Examiner*—David L. Stewart
*Attorney, Agent, or Firm*—Cushman, Darby & Cushman

[57] ABSTRACT

The invention relates to switching matrices used in exchanges of time-division kind and to networks using that kind of matrices. It consists in utilizing at the input and output of a symmetrical time matrix, a multiplexer and a demultiplexer which enable the overall circuit to address an arbitrary IT (time slot) of an arbitrary incoming junction, to an arbitrary IT on an arbitrary outgoing junction. A network using only that kind of matrices is disclosed.

15 Claims, 18 Drawing Figures

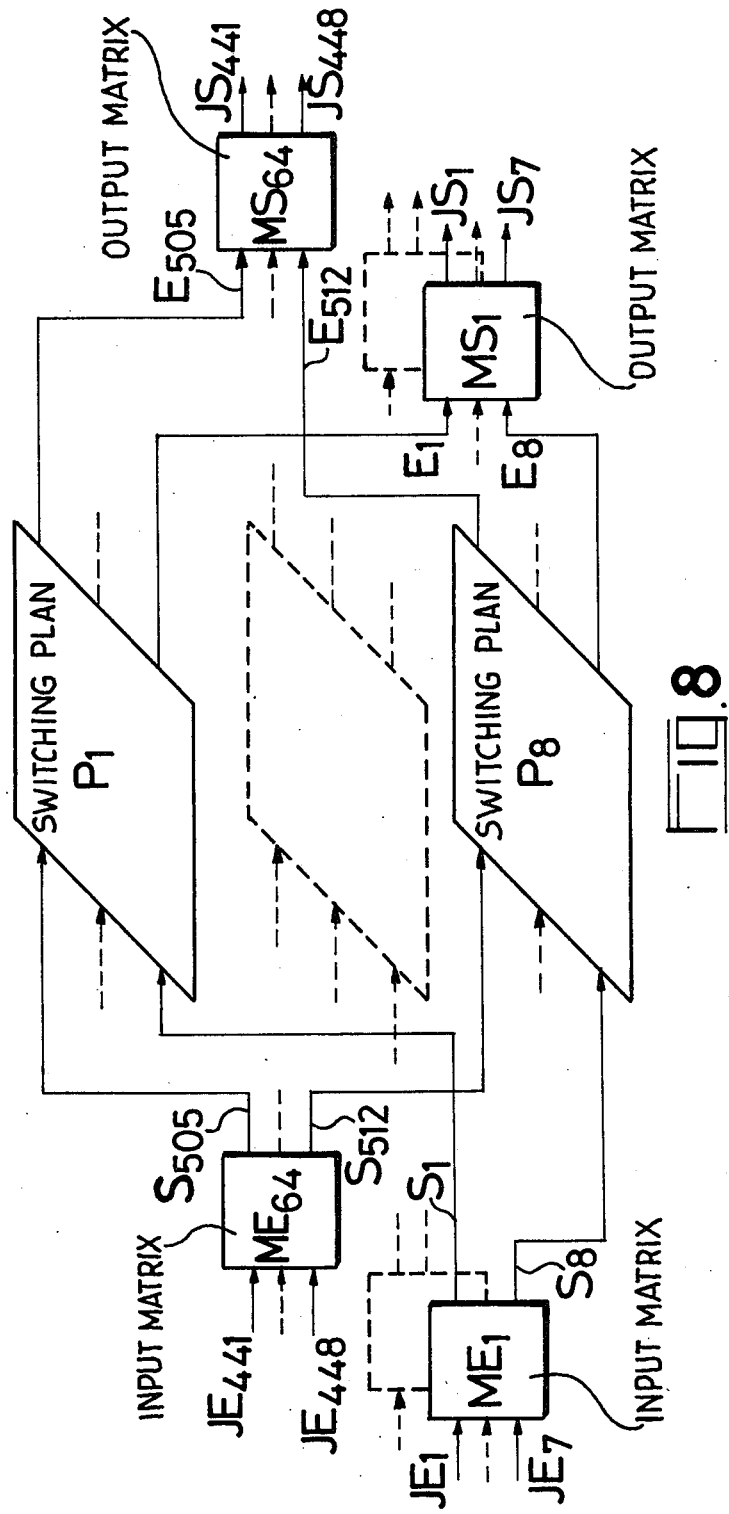

SYMMETRICAL TIME DIVISION MATRIX AND A NETWORK EQUIPPED WITH THIS KIND OF MATRIX

The present invention relates to symmetrical time division matrices which make it possible, in particular in exchanges, to switch a signal from a given position in an input frame to a given position in an output frame.

The invention relates also to modular time-division networks which, in telephone exchanges using the technique of pulse code modulation (PCM), enable a calling subscriber to be connected with a called subscriber.

The figures which will be referred to in the ensuing part of this text are offered purely be way of example and are not intended in any way to restrict the scope of the invention. These figures relate to the national and international standards which are more often than not used in conventional embodiments for obvious reasons of compatibility.

It is well known, where the transmission of telephonic communications is concerned, to sample the speech signals at a frequency of 8 kHz and then to convert the samples thus obtained to an 8-bit form, each sample being represented by and 8-bit word. These words are then multiplexed in accordance with a frame of 32 time slots IT (2 for signalling purposes and synchronisation) so that it is then possible to transmit through a multiplex link 30 simultaneous calls represented by a binary signal occurring at a rate of 2.048 MHz.

This kind of processing of telephony signals, known as PCM (pulse code modulation), makes it possible to use fully electronic automatic switching centres and numerous designs have been proposed which make it possible to create switching centres of this kind.

These designs often comprise an element known as a time switch which makes it possible to modify the distribution of a channel in a frame. To do this, a memory is filled with the 32 words of a frame in the order of their arrival, and the memory emptied by reading out the 32 words in the order required to obtain the desired frame format.

A time switch of this kind, quite obviously, only enables switching to be performed within one and the same frame, so that in order to change the frame it is necessary to use more complex structures which more often than not have recourse to other circuits which are referred to as spatial switches.

It is well known that a network of the TST type for example has a blocking level of zero if the number of internal meshes, whether of the time-division or matrix type, is equal to twice the number of access meshes.

Although maintaining a number of internal meshes equal to the number of access meshes provides for considerable economy in terms of hardware, it introduces a blocking level which is dependent upon the multiplexing ratio of the switched junctions to the extent that it fixes the number of attempts available in the network for routing the samples of conversation.

Thus, in order to obtain acceptable blocking ratios, there is used for example a circuit called MUX in FIG. 1 which effects a super-multiplexing between 8 incoming junctions $MIC_1$ to $MIC_8$ and 1 outgoing junction SMIC. In order to maintain a constant binary flow of 2.048 M bits/s, which is particularly well suited to the various, in particular technological, limitations, the incoming junctions are each present in series on one wire, whilst the outgoing junction is present in parallel on 8 wires. For the duration of the 8 synchronous frames of 32 time slots $IT_1$ to $IT_{32}$ which arrive at the 8 incoming junctions, a single frame of 256 elemental times $T_1$ to $T_{256}$ issues from the junction SMIC. Each of the time slots of the 8 incoming frames may be placed in each of the T's of the outgoing frame allowing for a possible delay of one frame due to the fact that an item of information is unable to issue before being entered. Thus, in the Figure for example, $IT_1$ of $MIC_7$ is placed at $T_1$ of SMIC, $IT_1$ of $MIC_1$ is placed at $T_3$ and $IT_2$ of $MIC_3$ is placed at $T_{162}$, these IT's and these T's being denoted by the increase in the thickness of the lines representing the MIC's and SMIC.

That part of the connection network which follows this circuit is thus composed of 8 identical and parallel plans, each plan being responsible for switching one of the bits of the sample of speech transmitted.

In accordance with the present invention there is provided a symmetrical time-division matrix for switching input time slots of a first set of input series PCM junctions toward output time-slots of a second set of output series PCM junctions, said matrix comprising:

parallelizing means for receiving simultaneously in serial form said input time slots from said input series PCM junctions and delivering successively in parallel form said input time slots;

time-division switching means for receiving said input time-slots from said parallelizing means according to a first order, and delivering successively in parallel form said output time slots according to a second order; and serializing means for receiving from said time-division switching means said output time-slots, and delivering simultaneously in serial form said output time-slots to said output series PCM junctions.

The term "symmetrical time division matrix" refers to the circuit of FIG. 2.

For a better understanding of the invention, and to show how the same may be carried into effect, reference will be made to the ensuing description and to the attached figures among which:

FIG. 8 represents the general architecture of a network according to the invention;

Figure 2:
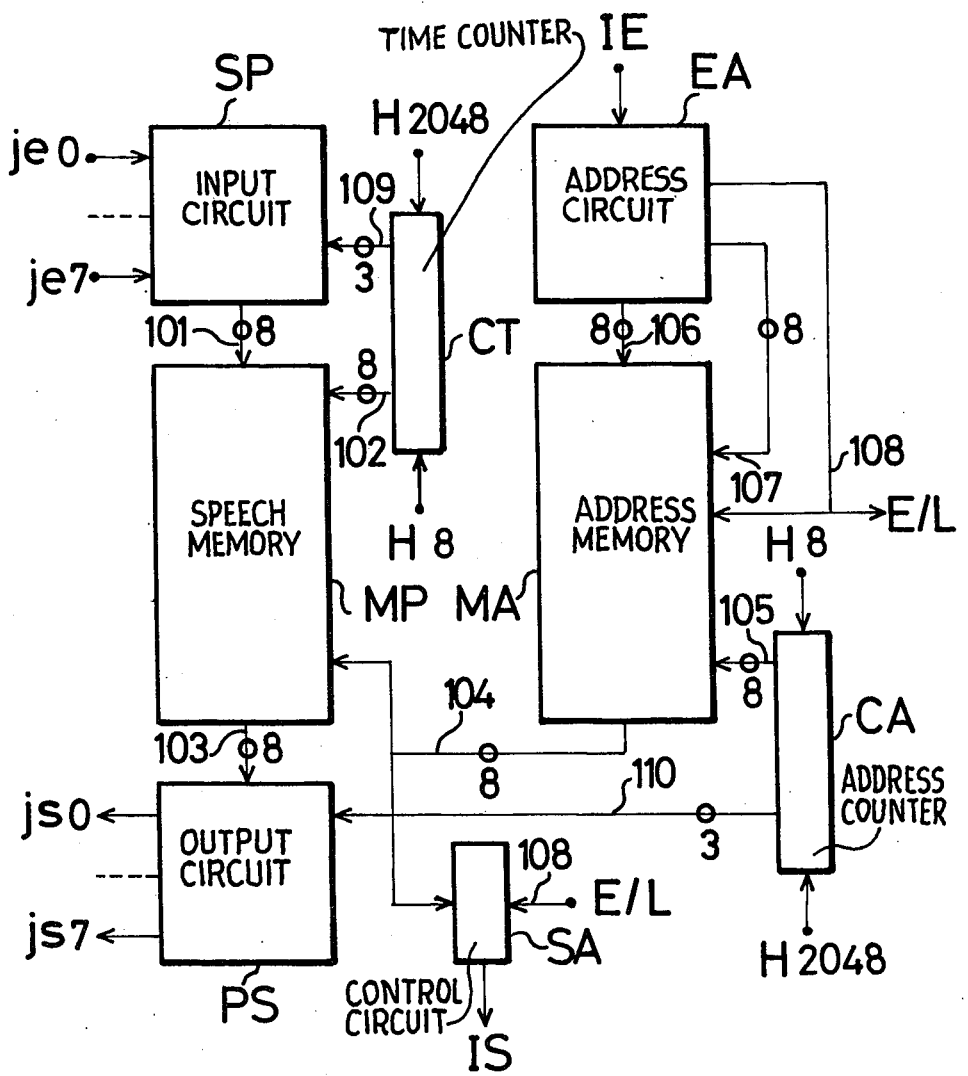
FIG. 2 represents the diagram of a matrix according to the invention.

The symmetrical time matrix shown schematically in FIG. 2 comprises an input circuit SP, an output circuit PS, a speech memory MP, an address memory MA, a time counter CT, an address counter CA, and address circuit EA and a control circuit SA. A connection shown in the form of a single line corresponds to a single wire carrying the signals made up of series bits, whilst a connection shown in the form of a line accompanied by a circle showing the figure $n$, corresponds to $n$ wires carrying signals made up of $n$ bits in parallel, this in accordance with a normal convention. Connections which carry service signals and which are of no importance when an understanding of the invention is concerned, these signals in particular comprising the clock signals designed to operate the registers, have been omitted from this illustration. These various service signals are formed internally in the elements illustrated, or in an element which has not been shown here and which furnishes clock signals whose frequencies and phases are appropriate, from the sole external clock signals which are $H_{2048}$ (bit rate clock) and $H_8$ (field rate clock).

Eight incoming junctions $je0$ to $je7$, each carrying a sequence of PCM frame made up of 32 time slots $IT_0$ to $IT_{31}$ in each case, arrive at the input circuit SP. These frames succeed one another at the rate of 8 kHz, in phase with the clock $H_8$. Each $IT_x$ corresponds to an 8-bit coded sample, and the rate of the bits arriving in series on each junction is thus 2.048 MHz, in phase with the clock $H_{2048}$. This rate corresponds to elementary time of 488 $ns$.

In the example described, the $IT_x$'s arriving in series on the eight incoming junctions are in phase and the function of the circuit SP, which will be described in more detail hereinafter, is to successively present in parallel on the eight wires of the output connection 101 of SP, the eight $IT_x$'s which have arrived together on the eight junctions, there being a shift from one to the next of one time element, this corresponding to a first permutation.

The number of $IT_x$'s leaving the circuit SP per unit time is thus, under these circumstances, equal to the number of $IT_x$'s arriving there per unit time, and the binary rate is therefore constant.

The connection 101 thus, every 488 $ns$, supplies to the input of the memory MP an $IT_x$ from one of the eight incoming junctions. This $IT_x$ is recorded in the memory MP at a position marked by the number $je_k$ corresponding to the incoming junction from which it stems, and by its order $IT_x$ in the particular frame. This memory is thus organised in the form of $32 \times 8 = 256$ words of 8 bits each, and the address of each of these words is represented by a number of eight-bit binary coded form, the three bits of lower weighting factor representing the $je_k$ and the five bits of higher weighting factor representing $IT_x$. These addresses being fixed and corresponding to a first given order, are obtained by the read-out of a 256-state time counter CT which operates at the rate determined by the clock $H_{2048}$. MP is supplied with the eight bits representing each state, through the medium of the connection 102. The counter CT is also supplied with the signal from the clock $H_8$, making it possible for it to lock into phase with the development of the frames, for example by virtue of an operation of resetting to zero with each $IT_0$ from the incoming junctions.

Figure 3:
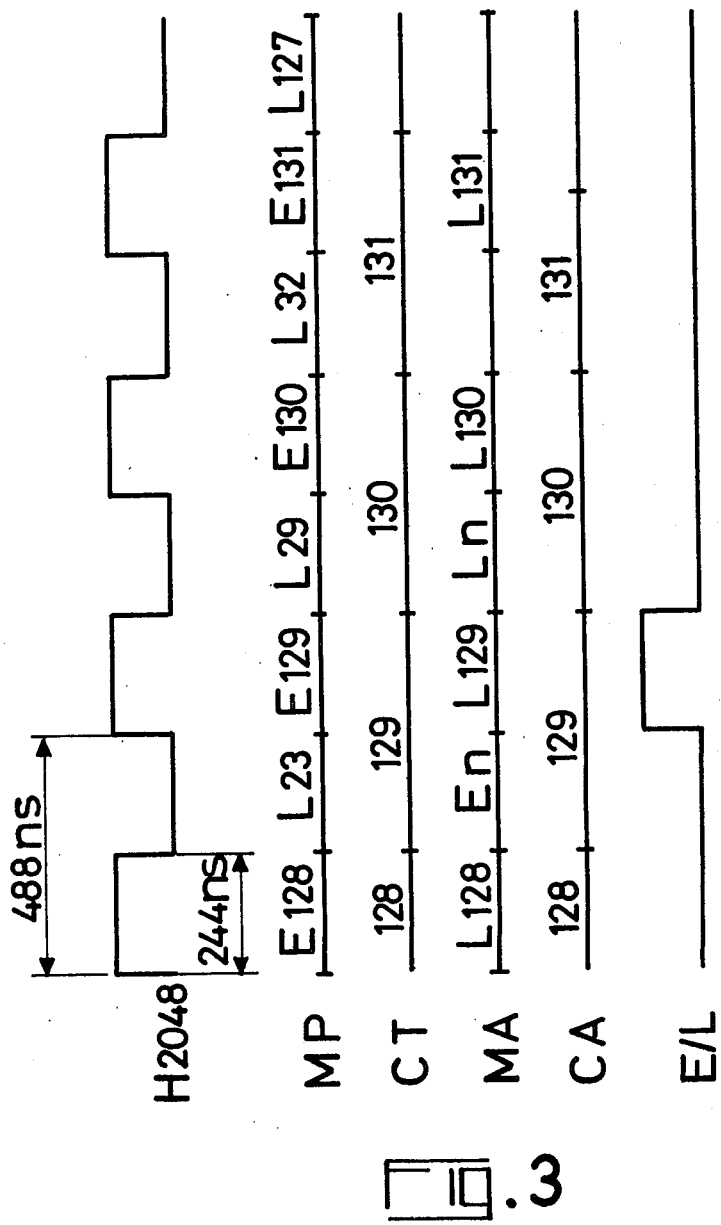
FIG. 3 represents a graph symbolising the states of some elements of the matrix.

Since it is necessary to record in and read out from said memory, with each time element, the time elements of 488 $ns$ each are divided into 244 $ns$ half-times, this being a straight forward matter since the clock signal is a squarewave signal at the frequency 2048 MHz. This clock signal is illustrated in FIG. 3 by $H_{2048}$. Recording in MP is carried out during the high states of the clock signal and read-out during the low states. The signal MP shown in FIG. 3 symbolises the sequence of cycles of the memory MP and the line CT the sequence of states of the counter CT, between the states 128 and 131. Recording is therefore initiated by the logic combination in the internal circuits of MP, of the states of CT and the high stages of $H_{2048}$, this yielding the cycles $E_{128}$ to $E_{131}$ which are located during the first half-periods of the time elements. The counter CT leads in phase by a half-time, in order to enable correct transmission of the recording address to MP to take place.

With each read-out half-period or half-time in other words, there is read out from MP a word located at a random address, which is given in eight-bit form by the address memory MA, the sequence of these addresses defining a second, given order. The words thus read out from MP leave the latter one after the other, in parallel, on the eight wires of the connection 103. Thus, the order of succession of the words has been changed between their input to MP through the connection 101 and their output therefrom through the connection 103, so that at this point in the system in effect time switching has been performed.

The circuit PS which will be described later on, makes it possible to present in series and simultaneously on each of the outgoing junctions $js_0$ to $js_7$, eight words which have arrived successively on the connection 103. The distribution thus achieved corresponds to a second, given permutation. Thus, on each of these eight outgoing junctions $js$, a PCM field made up of 32 of the total of 256 channels arriving on the set of eight incoming junctions $je$, is obtained.

It will be seen, therefore, that the switching function which, within the speech memory proper, is purely a time switching function, also becomes a spatial switching function due to the distribution between the eight-outgoing junctions. It should of course be pointed out that the element PS, and for that matter the element SP, are not spacial switches in the conventional sense since they distribute the words in accordance with given, constant cyclic permutations. In fact, it is the time switching of the words within each group of eight words intended for sequential distribution to the eight outgoing junctions, which brings about a spatial switching effect. This is the prime advantage of this matrix which directly allows time switching and space switching without introducing the blocking effect so characteristic of conventional spatial switches. It now becomes possible, using this circuit as the sole basic element, to construct large automatic exchanges which have a low, even zero blocking ratio. It can also be pointed out that this matrix is entirely symmetrical between the input and output, this on the one hand justifying the name given to it on the other hand making for major simplification in the design of automatic exchanges for the series connection of these matrices.

The addresses of the words to be read out from MP are contained in the address memory MA. The latter is memory organised in the form of 256 eight-bit words and is read cyclically in 125 μs under the control of the address counter CA; the words thus read out are transmitted through the connection 104 to MP. The counter CA cycles at the rate determined by the clock $H_{2048}$ and also receives a signal from the clock $H_8$ which keeps it in phase in just the same way as CT.

The line MA in FIG. 2 symbolises the succession of cycles of the store MA and the line CA the succession of states of the counter CA. Read-out is therefore initiated by the logic combination in the internal circuits of MA of the states of CA and the high states of $H_{2048}$, this yielding the cycles $L_{128}$ to $L_{131}$ which are located during the first half-periods of the elementary times. CA also leads in phase by a half-period for the same rasons given in relation to CT. The states of CA are thus transmitted in eight-bit form, in parallel, through the connection 105 to MA.

The word read out at the address thus defined represents the address of the word in MP which is to be read. It is transmitted through the connection 104 to MP. the internal circuits of MP decode this address and initiate the read-out of the word in MP, which corresponds to this address, this during a second half-period. Thus, considering FIG. 3, for example the read-out in MA of the words located at the addresses 128 to 131 ($L_{128}$ to $L_{131}$) brings about read-out in MP of the words 23, 29, 32 and 127 ($L_{23}$, $L_{29}$, $L_{32}$, $L_{127}$).

Each word which is read-out in MA represents the position of a word for read-out in MP, and since this position is defined by an incoming junction $je_k$ and a time slot $IT_x$ in this junction, we will designate this word in MA by the notation "$IT_\sigma\, je_k$" where $je_k$ corresponds to the three bits of low weighting factor and $IT_x$ to the five bits of high weighting factor. This word is read-out from MA at the instant at which the word in MP is to be read out, so that its address in MA represents an outgoing junction $js_1$ and a time slot $IT_y$ in said junction and we will designate this address by the notation "$IT_y\, js_1$", with the same distribution of bits.

The memory MA thus contains the information on 256 space time routes between the 256 $IT_x$'s of the junctions $je$ and the 256 $IT_y$'s of the junctions $js$. It goes without saying of course, that it is necessary to be able to modify the content of MA as a function of changes to be made to these routes in accordance with whether new connections are to be established or current ones broken.

To do this, on the connection IE there are transmitted a marking signal comprising the word "$IT_x\, je_k$" of 8 bits length which is to be fed into MA, and 8 bit word "$IT_y\, js_1$" indicating the address at which this word is to be recorded in MA, and several service bits.

The addressing circuit EA which will be descirbed hereinafter, then simultaneously transmits to MA the word "$IT_x\, je_k$" on the connection 106, the word "$IT_y\, je_1$" on the connection 107 and a signal E/L on the connection 108. This signal E/L is a single bit which furnishes to MA the command to record the word "$IT_x\, js_k$" at the address "$IT_y\, js_1$". This recording takes place during the first half-period of an elementary time, for example 129 in FIG. 3, since the second half-period is used for normal read-out. This corresponds to the recording $E_n$ in FIG. 3. Since, more often than not, it is required to check the result of this recording operation, the thus recorded word is read out during the first half-period of the elementary time following recording, namely 130 in FIG. 3, this giving us the read-out $L_n$. In the example described, a circuit inside MA, for example a flip-flop, memorises the information carried by the signal E/L in order to perform this read-out function, since this signal only has two states and the low state must not be allowed to trigger permanent read-out. In another embodiment, it would be possible to separately control read-out and recording by using two wires for the connection 108.

The words read out from MA are also transmitted through the connection 104 to the control circuit SA which is also supplied with the signal E/L through the connection 108. The circuit SA is a simple register, likewise equipped with a memory device for E/L and makes it possible to feed out serially on a wire an output piece of information IS which for checking purposes reproduces the word recorded in MA at the address "$IT_y\, js_1$" which word should therefore be "$IT_x\, je_k$".

Figure 4:
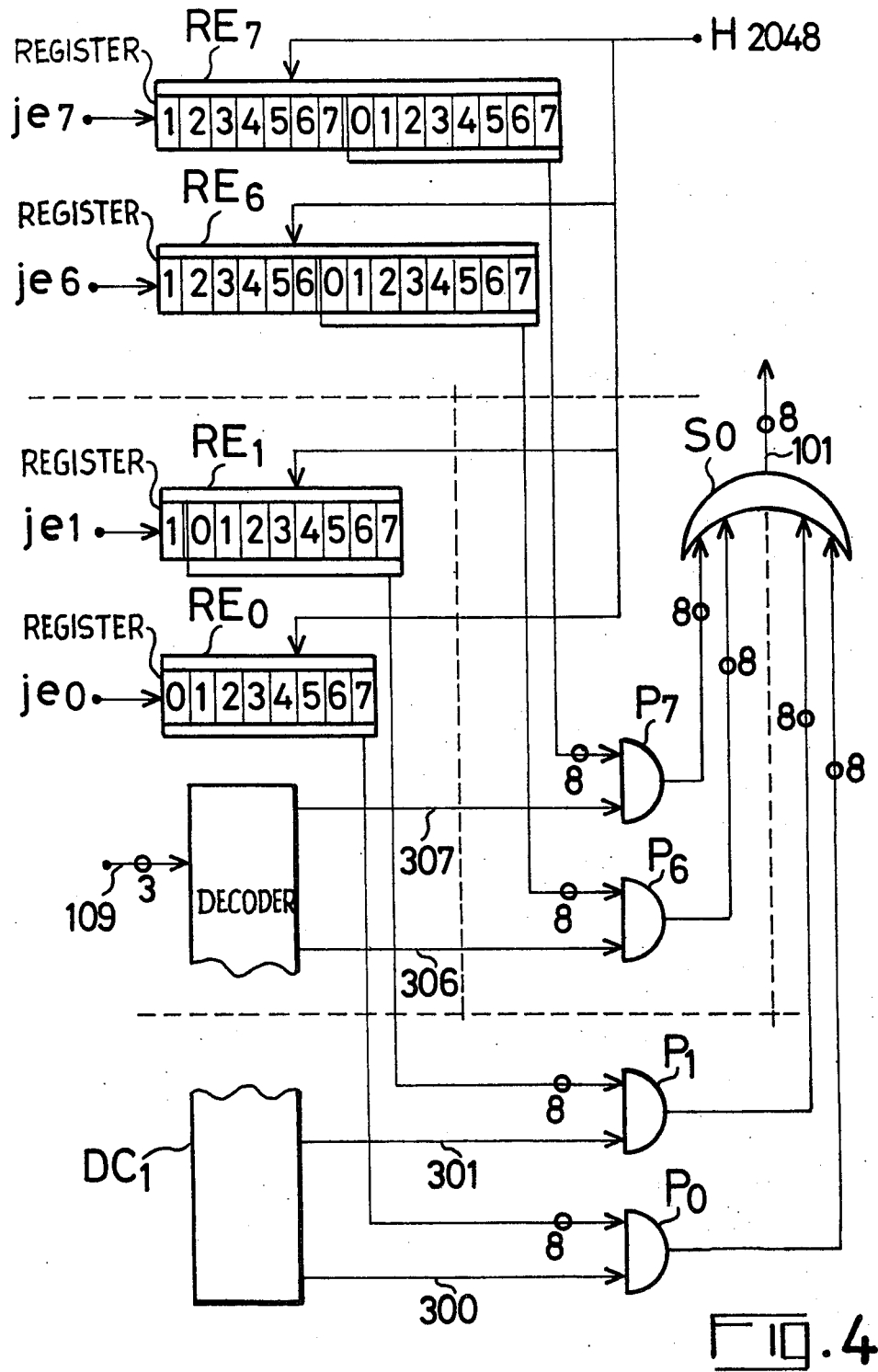
FIG. 4 represents the diagram of the element SP represented in FIG. 2.

FIG. 4 provides a fragmentary illustration of an embodiment of the input circuit SP, comprising eight input registers $RE_0$ to $RE_7$, a decoder $DC_1$, eight AND-gates $P_0$ to $P_7$ and an OR-gate SO.

The incoming junctions $je_0$ to $je_7$ are respectively connected to the registers $RE_0$ to $RE_7$. The bits arriving serially on these junctions progress through the registers as they arrive, under the control of the clock $H_{2048}$.

Each of these registers has eight input information stages 0 to 7 located at the right-hand in the figure and corresponding to the 8 bits arriving during the course of an $IT_x$. They also comprise additional input stages located at the left-hand in the figure; the number of these stages is equal to the index of the register.

Thus, at the end of eight elementary time periods of an $IT_x$, the eight bits which have arrived on each junction will be memorised in the eight first left-hand stages of the registers RE, although whereas the eight bits of the $IT_x$ of the junction $je_s$ would all be in the information stages 0 to 7 of $RE_0$, only the first 7 bits of the $IT_x$ on the junction $je_1$ will be memorised in the information stages 0 to 6 of $RE_1$, and so on up to $RE_7$ in which only one bit of the $IT_x$ on the junction $je_7$ will be stored in the information stage 0. The bits which are not at the information stages are in the additional stages.

The information stages are respectively connected to the AND-gates $P_0$ to $P_7$. These gates are represented in a highly symbolic manner as acting upon the assembly of wires of a connection. They receive operating signals from the decoder $DC_1$.

The decoder $DC_1$ receives from the counter CT via the connection 109, the three bits of low weighting, these three bits defining a cycle of eight states during eight elementary time intervals. It successively opens the gates $P_0$ to $P_7$ through the medium of the connections 300 to 307. Thus, during the first elementary time of an $IT_x$, the gate $P_0$ allows the eight bits coming from the information stages 0 to 7 of $RE_0$, these being the 8 bits of the $IT_{x-1}$ of the junction $je_s$, to pass in parallel.

During the next elementary time, the bits will have progressed by one stage through each RE and the eight bits of the $IT_{x-1}$ of the junction $je_1$, will be in the information stages 0 to 7 of $RE_1$. The decoder then opens $P_1$ which allows these 8 bits to pass in parallel.

The cycle continues until, with the seventh elementary time, the decoder opens $P_7$ allowing the eight bits of the $IT_{x-1}$ of junction $je_7$, these being located in the information stages 0 to 7 of $RE_7$, to pass in parallel.

The OR-gate SO, also illustrated in a highly symbolic way here, combines the outputs of the AND-gates $P_0$ to $P_7$ and on the connection 101, during each elementary time, delivers the eight bits of an $IT_x$ of one of the junctions $je_0$ to $je_7$. Thus, during the time for which the $IT_x$'s of the incoming junctions arrive in the circuit SP, the eight $IT_{x-1}$'s of these junctions leave successively via the connection 101.

Figure 5:
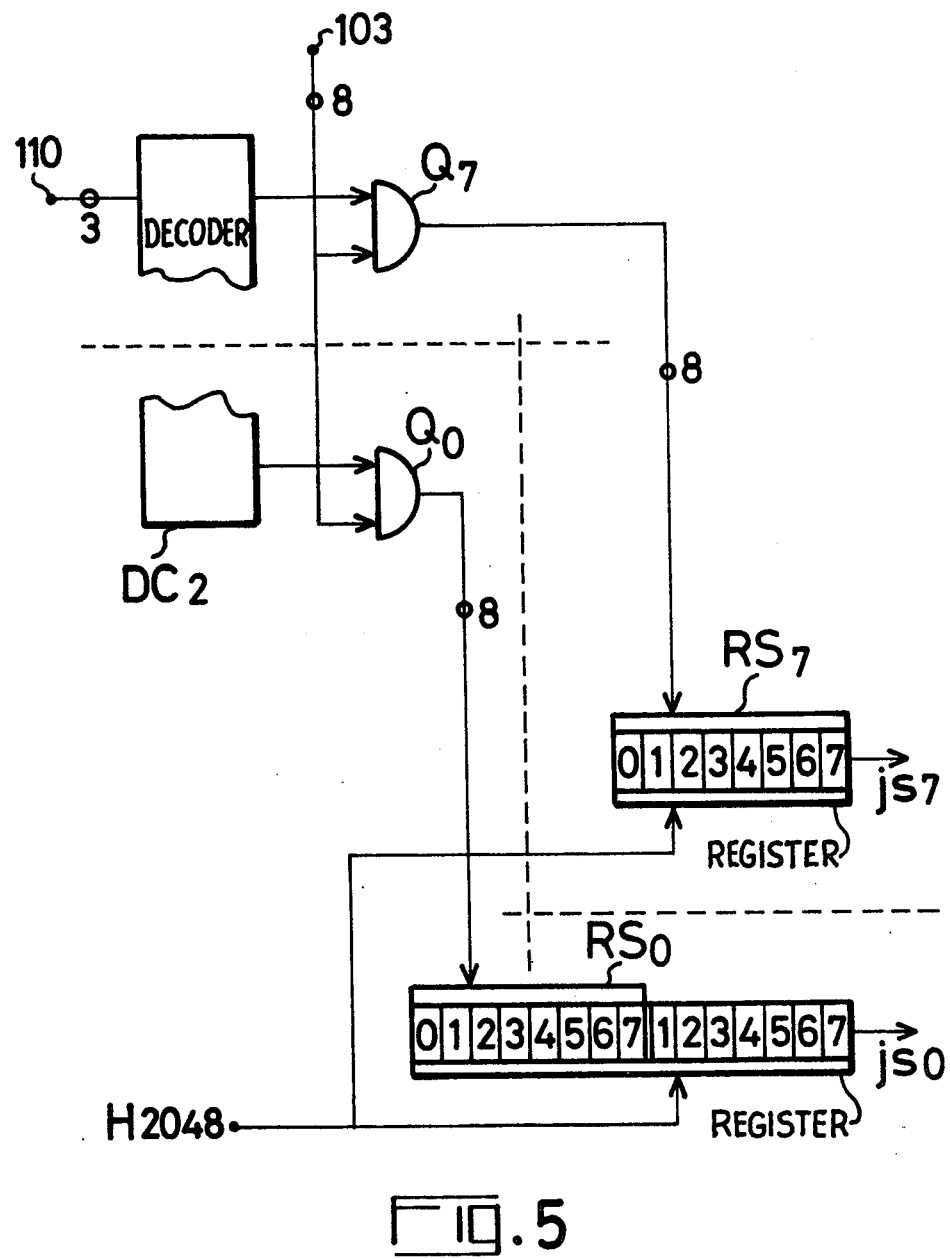
FIG. 5 represents the diagram of the element PS represented in FIG. 2.

The output circuit PS essentially operates in the reverse fashion to the input circuit SP. It has therefore been illustrated in a more simplified fashion and limited to two outgoing junctions in FIG. 5, its operation will be described very briefly. The circuit PS comprises, in the embodiment of FIG. 5, a decoder $DC_2$, eight AND-gates $Q_0$ to $Q_7$ and eight output registers $RS_0$ to $RS_7$.

The decoder $DC_2$ operates in the same fashion as $DC_1$, on the three low-weighted bits from the address counter CA, which arrive via the connection 110. These three bits code eight states which serve to successively open the eight gates $Q_0$ to $Q_7$ during the successive arrivals, in the course of eight elementary times, of $IT_y$'s on the connection 103.

These $IT_y$'s are then fed in parallel as the gates Q supply them, into the output information stages of the output registers $RS_0$ to $RS_7$. These information stages 0 to 7 are in this instance at the ends of the registers, namely at the left-hand side in the figure. The $IT_y$'s thus progress through the register stages, leaving serially in the outgoing junctions $js_0$ to $js_7$.

The registers $RS_n$ are also equipped with additional output stages, numbering 7-n, located at the right-hand side of the figure. Thus, a delay which varies in accordance with the register is introduced in the time of output of the $IT_y$'s on the junctions $js$. This delay compensates for the delay introduced by the successive loading of the eight registers so that the $IT_y$'s are synchronous in the PCM frames fed out on the junctions $js$.

It should be pointed out that the words read out from MP and then serially arranged in PS are available at the output of PS synchronously with the words fed into SP, this meaning that the symmetrical time matrix retains the synchronism of the IT's and thus makes it possible to arrange the matrices in series without any matching being needed.

It may be pointed out also that the presence of the additional stages in the input RE and output RS registers is only necessary in fact if it is required that the PCM frames should be synchronous both at input and at output.

If an exchange were to be used, which did not impose this kind of synchronising condition, then such additional stages could be dispensed with.

Figure 6:
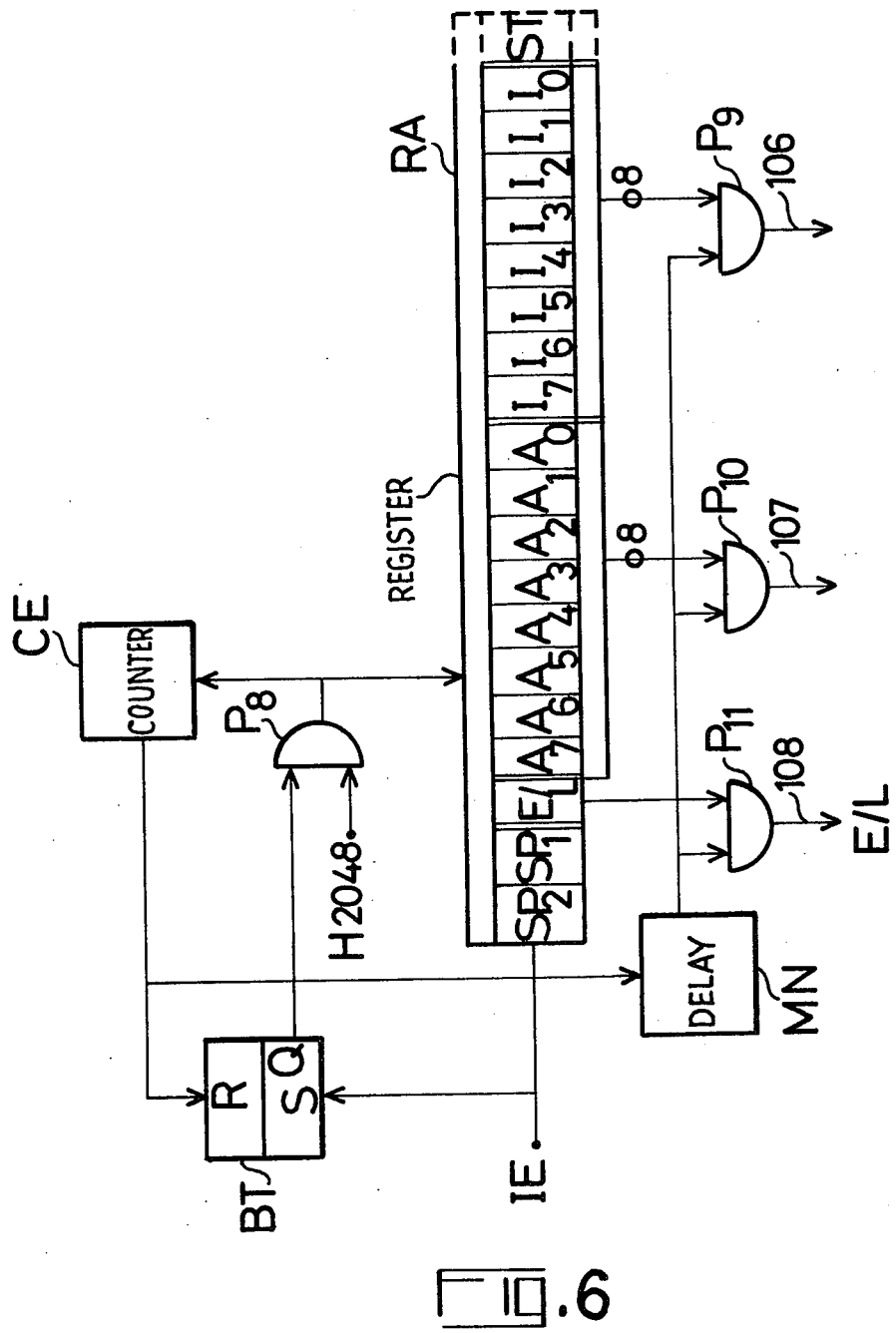
FIG. 6 represents the diagram of the element EA represented in FIG. 2.

FIG. 6 schematically illustrates an embodiment of the addressing circuit EA, which comprises a main register RA, four AND-gates $P_8$ to $P_{11}$, a counter CE, a flip-flop BT and a delay circuit MN.

The marking signal, which, in this example, is transmitted serially at the rate of 2,048 MHz on the connection IE, is here made up of 20 successive bits comprising a starting bit ST, eight bits $I_0$ to $I_7$ representing the word "$IT_x$ $je_k$" which is to be recorded in MA, eight bits $A_0$ to $A_7$ representing the address "$IT_y$ $js_1$", at which this word is to be recorded, a record/read-out bit which furnishes the recording or read-out command, and two stop bits $SP_1$ and $SP_2$.

This signal is applied through the connection EI to the main register RA through which it passes at the rate determined by the clock $H_{2048}$. For this purpose, IE is also applied to the input S of the flip-flop BT which is of the "RS" type. The first bit of the signal, which is the starting bit, this always having a value equivalent to a logic "1", places the flip-flop in such a fashion that at its output Q a "1" appears; this flip-flop will remain in this state until a "1" is applied to its input R so that its state is changed, causing it to produce a "0" at Q. The output Q of BT is applied to the AND-gate $P_8$ which is also supplied with the signal $H_{2048}$. $P_8$ is therefore opened when the output Q carries a "1", and allows $H_{2048}$ to pass to RA as well as to the counter CE.

At the end of 20 elementary time periods, the marking signal will therefore have been stored in RA and the 20 stages of the latter will then contain the bits shown in the figure. It should be pointed out that the twentieth stage at the right contains the starting bit ST which is not used in this embodiment; this stage can therefore be omitted and is represented in broken line for this reason.

When it has counted 20 elementary time periods, the counter CE furnishes a bit "1" to the input R of BT; this bit is also applied to the delay circuit MN. It should be pointed out that at this same instant, the second stop bit $SP_2$ is received, this being a "0", as also is $SP_1$, the result of this arrangement being that there is no ambiguity caused between the inputs R and S of BT. The presence of two stop bits is merely a precaution. The flip-flop BT therefore resets to give Q = "0", this resulting in the closing of the gate $P_8$ and disconnecting the signal $H_{2048}$ from RA. The marking signal is thus fixed in the register RA in the manner indicated in the figure.

The delay circuit MN is then triggered by CE and supplies an opening signal to the gates $P_9$ to $P_{11}$. The delay in this signal is adjusted in such a fashion that during the first half-period of the ensuing elementary time period, the arrival of $SP_2$ occurs so that we are in fact dealing with a phase of recording in MA. These three gates are thus opened and allow the following bits to pass:

$P_9$ passes the bits $I_0$ to $I_7$ in parallel on the connection 106;

$P_{10}$ passes the bits $A_0$ to $A_7$ in parallel on the connection 107;

$P_{11}$ passes the bit E/L on the connection 108.

The value of the bit E/L is a function, as we have seen earlier, of whether it is required to record or to read out MA. If read-out is required, MA takes no account of the content of $I_0$ to $I_7$ so that the actual form of this content does not matter.

The time-division matrix which has been described is particularly significant when designed in the form of an integrated circuit. Indeed by counting off the inputs and outputs required for this kind of embodiment, we arrive at a figure of 22, arranged as follows:

$je_0$ to $je_7$ : 8
$js_0$ to $js_7$ : 8
IS : 1
IS : 1
H8 : 1
$H_{2048}$ : 1
supplies : 2

Thus, in a single standard 22-pin housing, it is possible to accommodate a symmetrical time-division matrix, involving no blocking, which makes it possible to achieve 256 simultaneous paths between eight incoming 32-channel PCM junctions and eight outgoing 32-channel PCM junctions.

Figure 1:
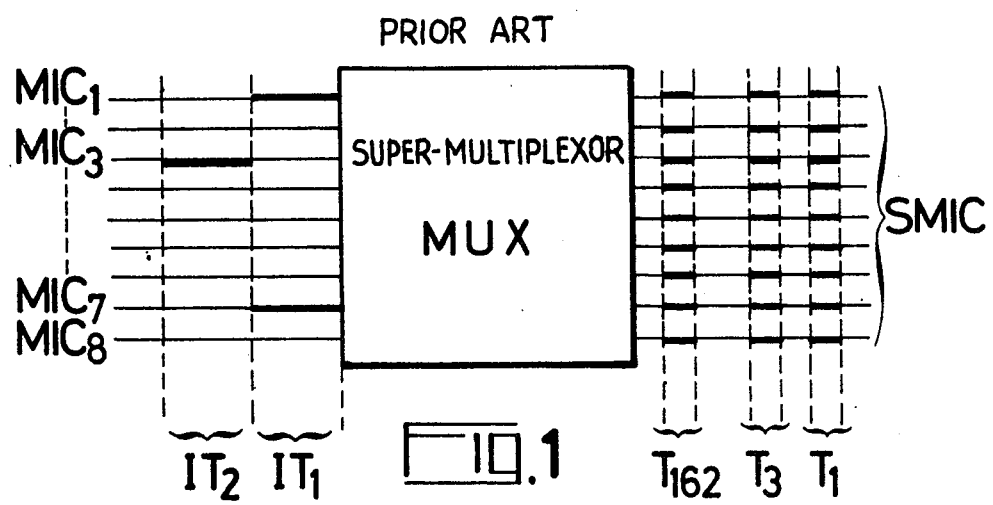
FIG. 1 represents a diagrammatic view of a connection circuit from prior art.
Figure 7:
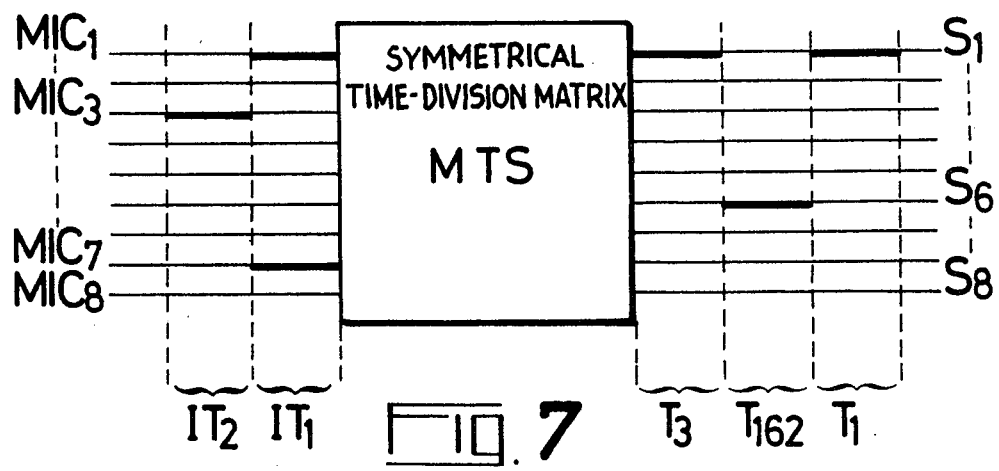
FIG. 7 represents a diagrammatic view of a symmetrical time-division matrix.

FIG. 7 represents a symmetrical time-division matrix MTS of the type defined above. However, rather than individualise each outgoing PCM junction, it has been preferred to consider these junctions as a whole as being a single channel in which 256 time slots $T_1$ to $T_{256}$ have been defined, these times being distributed in groups of 32 per junction S, i.e. the first 32 for $S_1$, the following 32 for $S_2$ and so on up to the last 32 for $S_8$. Naturally these time-slots correspond modulo 32 to the time-slots of the junctions S and it is for this reason that the Fig. shows the switching of $IT_1$ of $MIC_7$ at $T_1$ ($T_1 = IT_1$ of $S_1$), of $IT_1$ of $MIC_1$ at $T_3$ ($T_3 = IT_3$ of $S_1$) and of $IT_2$ of $MIC_3$ at $T_{162}$ ($T_{162} = IT_2$ of $S_6$), these time-slots and these T's being denoted in FIG. 7 by increases in the thickness of the lines, as in FIG. 1.

FIG. 8 shows a connection network designed for switching 448 PCM junctions which corresponds very substantially to an automatic exchange of 5000 Erlangs. This network only comprises matrices of the MTS type and is shown in highly simplified form so as not to overload the Fig.

The incoming junctions $JE_1$ to $JE_{448}$ are connected in groups of 7 to the 64 input MTS's $ME_1$ to $ME_{64}$. Naturally this leaves one input free in each MTS. Since the MTS circuit does not effect any change in flow, only 7 of the 8 outputs will be necessary for handling the traffic. Accordingly, the eighth output may correspond to a relief network plan capable of being substituted for one of the other 7 plans. This free input may be used as a test input.

The output junctions $JS_1$ to $JS_{448}$ are connected in groups of 7 to the 64 output MTS's $MS_1$ to $MS_{64}$ symmetrically to the incoming junctions.

The number 1 outputs of the ME's, i.e. $S_1, S_9 \ldots S_{505}$, are connected to the switching plan $P_1$. The number 2 outputs of the ME's are connected to the switching plan $P_2$ and so on up to the number 8 outputs, i.e. $S_8, S_{16} \ldots S_{512}$, which are connected to the switching plan $P_8$.

Symmetrically the number 1 inputs of the MS's, i.e. $E_1, E_9 \ldots E_{505}$, are connected to the switching plan $P_1$ and so on up to the number 8 inputs of the MS's, i.e. $E_8, E_{16} \ldots E_{512}$, which are connected to the switching plan $P_8$.

The central control unit of the connection network (not shown in the Fig.) allots to each of the time-slots arriving at the JE's a time $T_j$ of the ME's, such as defined above, and symmetrically allots each time-slots issuing from the JS's to a time $T_k$ of the MS's.

$T_j$ and $T_k$ must correspond to the same plan $P_i$ and this allotment automatically defines one of the eight connection plans $P_1$ to $P_8$. This is because, since the words issue in series from the ME's and re-enter in the same mode, they pass through a single connection S and a single connection E which are both connected to a single plan P. Thus, it can be seen that each of these plans will be independent up to and including in particular the level of the control means of the connection circuits which it contains. This clearly distinguishes the connection network according to the invention from the connection networks of the prior art which use MUX circuits, such as that illustrated in FIG. 1, because even if separate switching plans were to be used in this case, they could not be independent of one another because, since they each handle one bit of the same word, they would have to have the same control means which would give them identical control signals.

Figure 9:
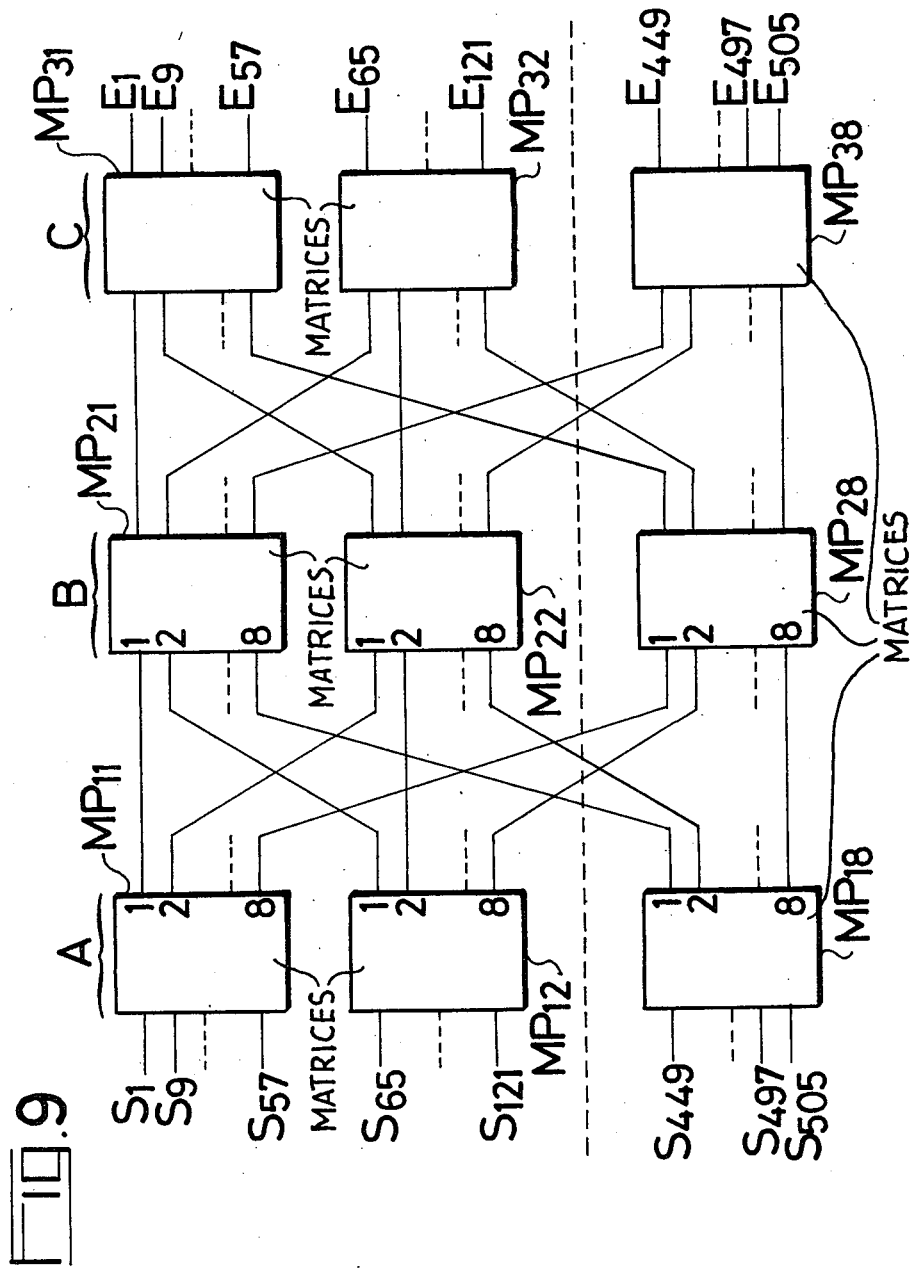
FIG. 9 represents a simplified diagram of one of the switching plans of the network represented in FIG. 8.

These plans are therefore identical with one another and one of them, i.e. $P_1$, is shown in FIG. 9. This plan is connected on the one hand to the 64 number 1 outputs of the input matrices ME, i.e. $S_1, S_9 \ldots S_{497}, S_{505}$, and on the other hand to the 64 inputs of the output matrices MS, i.e. $E_1, E_9 \ldots E_{497}, E_{505}$. The control circuits which address signals enabling the required routes to be established to the connection circuits have not been shown. These connection circuits are once again circuits of the MTS type; they are grouped into three successive stages of eight matrices, the first stage comprising $MP_{11}$ to $MP_{18}$, the second stage $MP_{21}$ to $MP_{28}$ and the third stage $MP_{31}$ to $MP_{38}$.

The characteristics of the MTS circuit enable any one time interval of an incoming junction to be switched to any one time interval of an outgoing junction. It is necessary, from this basic characteristic, to be able to switch any one time interval of a junction S to any one time interval of a junction E. This is done by a mixing process involving the various inputs and outputs of the MP's which constitute the three stages of the plan. This mixing is the same between the first and the second stage and between the second and third stage. It is clearly illustrated in the Fig. and consists in connecting the eight outputs of $MP_{11}$ to the eight number 1 inputs of the MP's $MP_{21}$ to $MP_{28}$, the eight outputs of $MP_{12}$ to the eight number 2 inputs of the MP's $MP_{21}$ to $MP_{28}$ and so on up to the eight outputs of $MP_{18}$ which are connected to the eight number 8 inputs of the MP's $MP_{21}$ to $MP_{28}$. Thus, as can be seen from FIG. 4, there is always one possible route between an input S and an output E.

This mixing is the same as that which would be used in a conventional network composed of 8 × 8 spatial matrices. The use of MTS's completely changes the possibilities of using this network by substantially eliminating the blocking risks.

Figure 10:
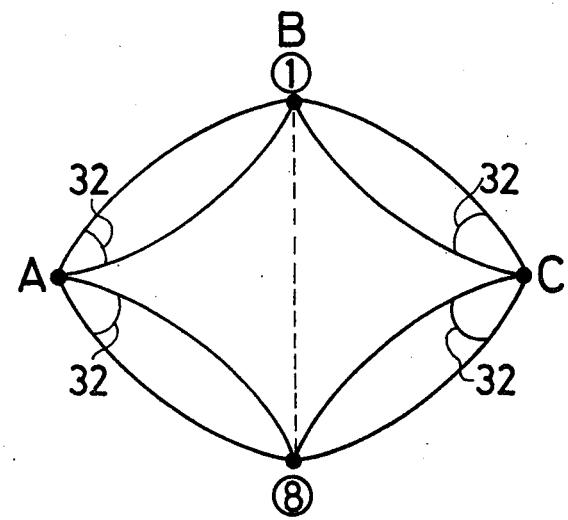
FIG. 10 represents a graph of the routes available in an ordinary network.
Figure 11:
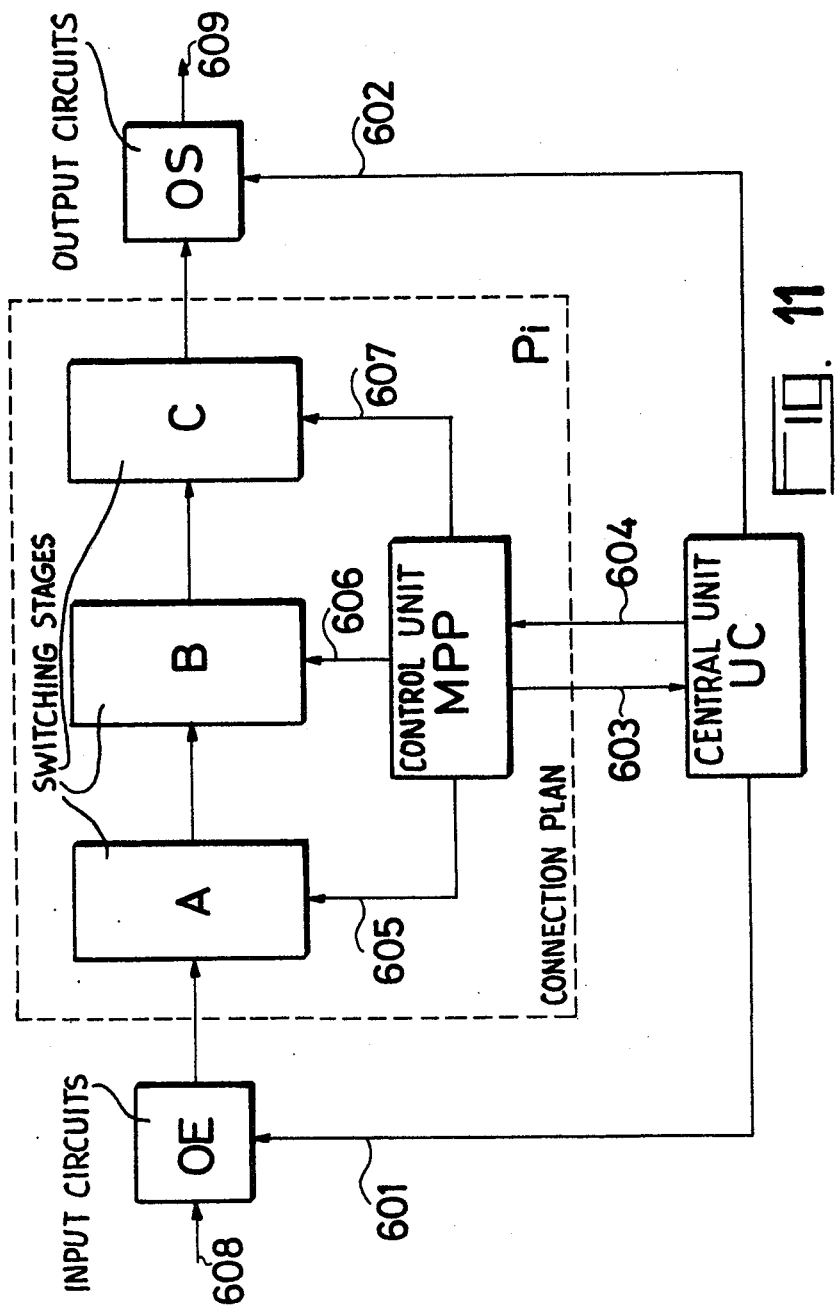
FIG. 11 represents a block diagram of a network according to the invention and shown with its control circuits.

The blocking of a plan P comprising a spatial network may be calculated by means of the graph shown in FIG. 10. Since this network is inserted between two time-division stages, there are 32 times in which it may be traversed, but since this time is fixed and is the sole time for the network as a whole, it remains constant for each of the eight possible routes from A to C passing through B. Thus, the number of routes is equal to $8 \times 32 = 256$, which leads to a blocking level of $3.10^{-5}$ which is equivalent to one blocking every 3 hours. Accordingly, it is necessary in this case, in order to eliminate this blocking, to provide a retroaction at the level of the central control unit of the connection network. In the event of blocking in a plane, this retroaction enables new times $T_j$ and $T_k$ (which in this case are the same) to be reallotted in the ME's and the MS's for changing the access time to the switching network composed of the 8 plans.

Figure 18:
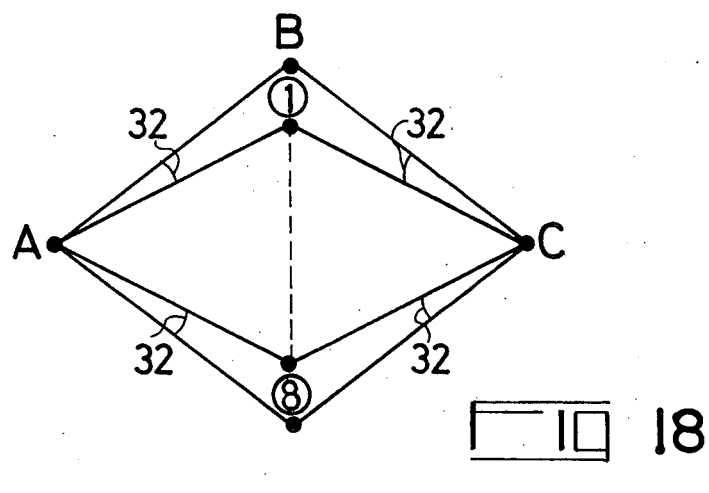
FIG. 18 represents a graph of the routes available in a network according to the invention.

In the case of the network composed solely of MTS's according to the invention, it is thus possible, as shown by the graph in FIG. 18, to change times at the level of the stage B which produces $8 \times 32 \times 32 = 8192$ possible routes. The blocking level is thus $10^{-23}$. Accordingly, it can be said that, in this case, the risk of blocking is zero on the human scale.

By virtue of this extremely reduced blocking level, the allocation of the times $T_j$ and $T_k$ mentioned above may be handled independently of the search for the space/time-division routes within the plans P, except for the case where one of these plans is out of order which would necessitate a reconfiguration. This is because, once the times $T_j$ and $T_k$ have been allocated, at least one free route will be certain, on the human scale, of being found in the plan $P_i$ so that there will be no need to retroact on the choice of $T_j$ and $T_k$. Under these conditions, the search for the global route is extremely simplified, as shown in FIG. 10.

FIG. 10 diagrammatically illustrates part of an automatic exchange comprising input circuits OE (ME in FIG. 8), output circuits OS (MS in FIG. 8), connection plans P, of which only one $P_1$ is shown, and a central unit UC. In accordance with the invention, the plan $P_i$ comprises three stages A, B and C in series, corresponding respectively to the stages $MP_{1X}$, $MP_{2X}$ and $MP_{3X}$ in FIG. 8, and a control unit MPP.

It is desired to connect one of the channels of a junction JE arriving at OE by the connection 608 to one of the channels of a junction JS departing from OS by the connection 609.

To this end, UC allocates a time $T_j$ corresponding to one output $S_m$ of OE and a time $T_k$ corresponding to one input $E_n$ of OS. The times and the designations accompanying the circuits are addressed to OE by the connection 601 and to OS by the connection 602. The same bits of information are addressed to the control unit MPP by the connection 604.

This unit MPP is formed, for example, by a microprocessor of the type currently available on the market. The search for a route in a plan corresponding to a load low enough for it to be entrusted to a microprocessor.

The MPP memorises all the routes already allocated and searches for a suitable non-allocated route enabling the required connection to be established. When this route has been found, which is always possible as has been seen, it addresses control signals to the stages A, B and C through the connections 605, 606 and 607, respectively, to enable the required connection to be established. It then addresses an end-of-selection signal to the central unit UC through the connection 603 to indicate that the connection has been established. It has to be seen that this signal does not correspond to a retroaction because it does not give any command to change the allocation of $T_j$ and $T_k$ in OE and OS.

This clearly shows that the working load corresponding to the establishment of communications is distributed between the central unit and the eight control circuits of the plans P. A highly modular system is thus obtained, enabling the safety normally obtained by duplicating the hardware (2 n) to be obtained with $n + 1$ hardware.

As already mentioned, only 7 out of 8 junctions are used at the input and output of the ME's in this example. Accordingly, in the event of maximum occupation of the inputs, there is no need to use more than seven plans. In fact, to optimise the speed of selection, the traffic as a whole will generally be distributed over the eight plans. In this way, in the event of failure of one plan, it will be sufficient to distribute the traffic passing through that plan over the seven remaining plans, which will always be possible because the failure of one plan does not affect the others and because the maximum traffic is able to pass through seven plans.

Figure 12:
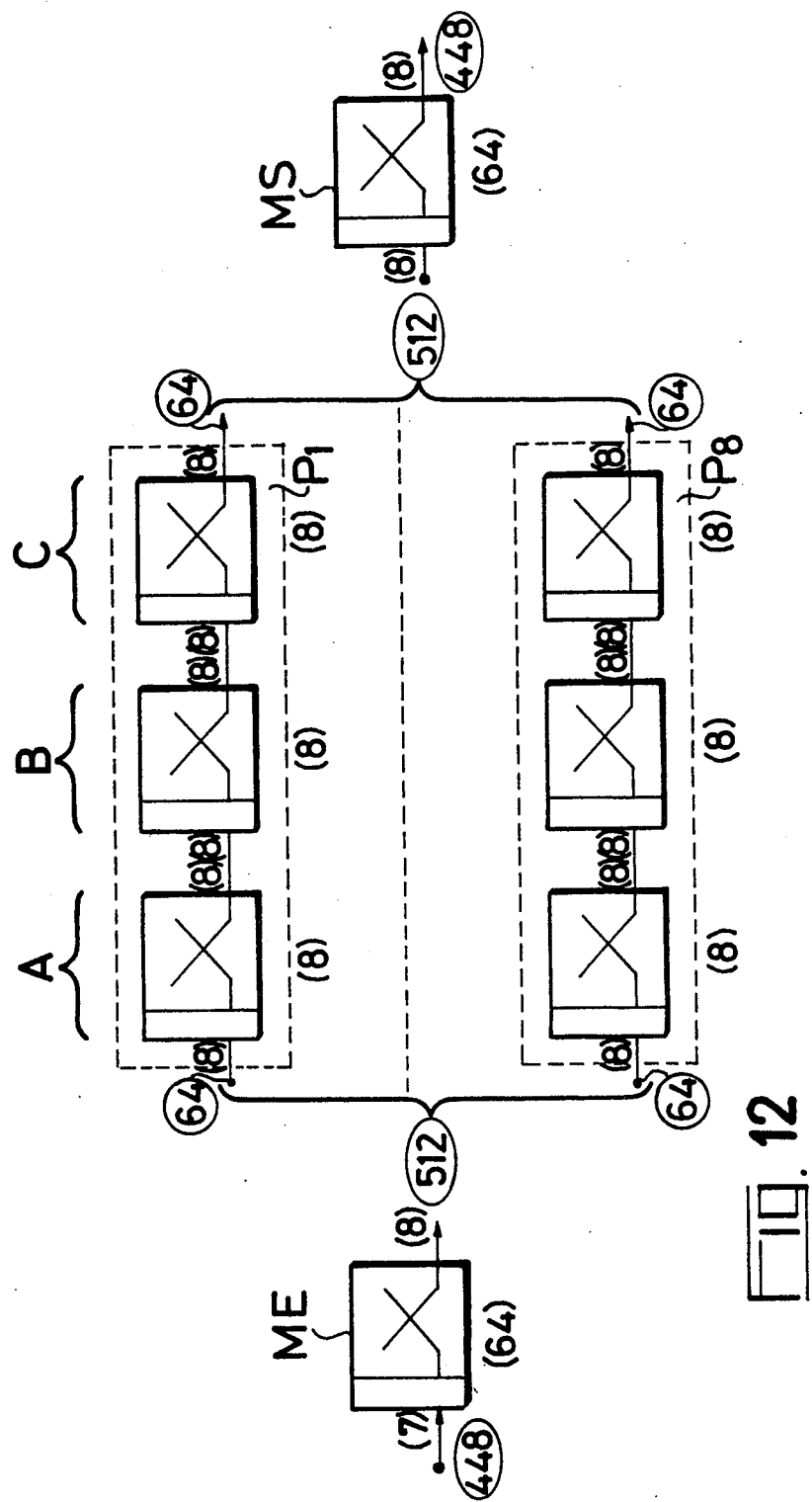
FIG. 12 represents, with established symbols, a network designed for a traffic of about 5,000 Erlangs.

In order to describe other networks according to the invention in more detail, a symbolic representation derived directly from that commonly used for illustrating spatial connection networks has been adopted. FIG. 12 uses this symbolism to illustrate the network described above for 448 PCM junctions. In relation to the symbolisation of an ordinary spatial matrix, the left-hand vertical rectangle has been added to obtain the symbol representing an MTS. The numbers in brackets on the left and right of the symbol correspond to the number of incoming and outgoing junctions. The number in brackets below the symbol corresponds to the number of MTS's used in the stage illustrated. The Fig. clearly shows the 64 input ME's, the 64 output ME's and the eight plans each containing three stages 1, B, C of 8 MP's. The numbers surrounded by a circle correspond to the total number of incoming junctions in the stage illustrated.

A connection network according to the invention for switching 896 PCM junctions, which corresponds to a traffic of approximately 10,000 Erlangs, thus comprises 128 MTS's at the input end (corresponding to the 64 ME's) of the preceding network and 128 MTS's at the output end (corresponding to the 64 MS's) of the preceding network. It will similarly comprise eight connection plans each organised into three stages A, B and C.

Figure 13:
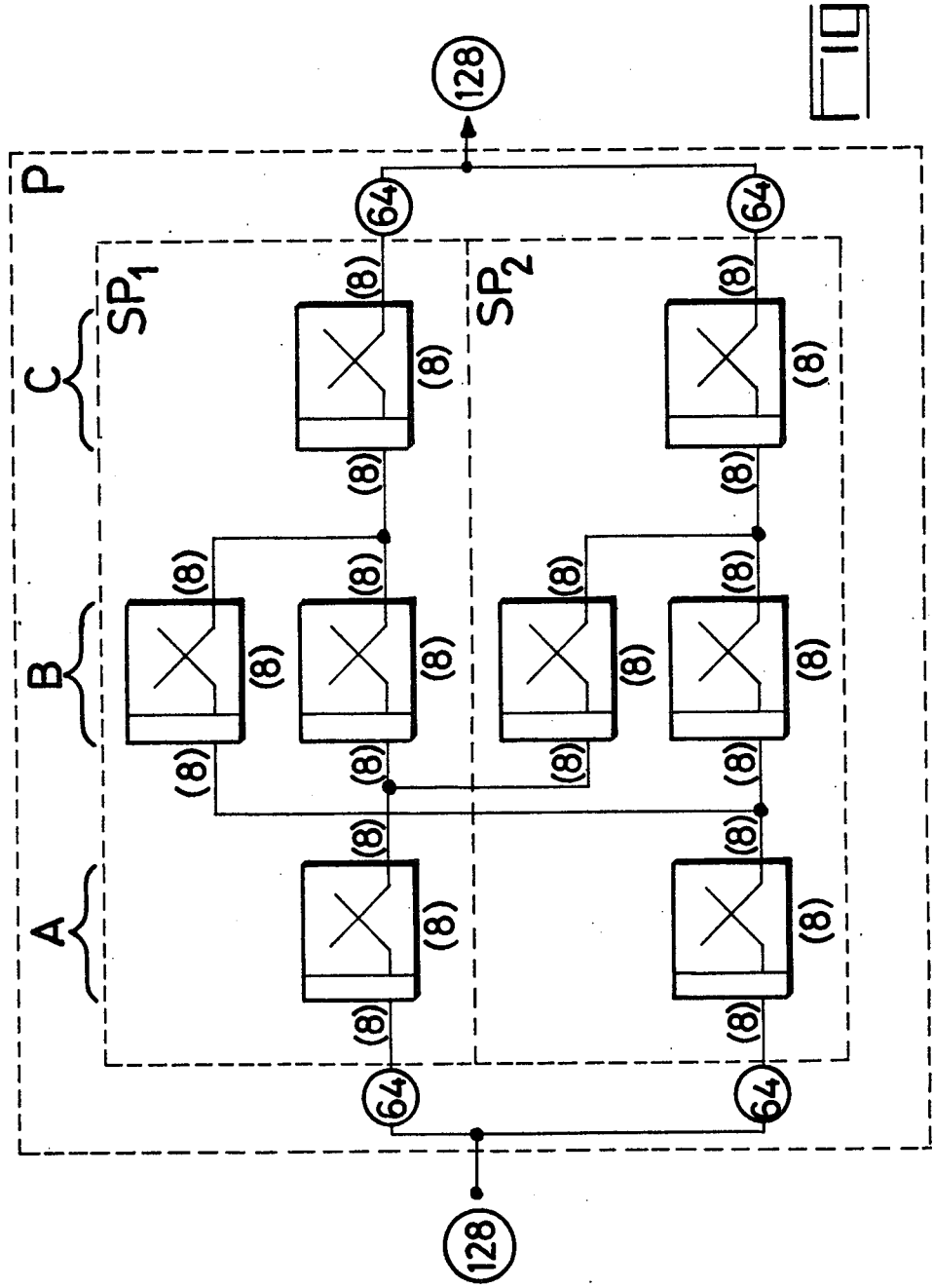
FIG. 13 represents, which the symbols used in FIG. 12; a network designed for a traffic of about 10,000 Erlangs.

Since there are twice as many inputs and outputs on each plan, it is necessary to modify the composition of the plans. To this end, it is of advantage to start with the composition defined for the network with 448 junctions. In this network, each plan may correspond, in an embodiment using the current technology, to a single printed circuit card on which places are available for adding other MTS circuits. Thus, by using two of these cards on each of which 8 MTS's are added in the central stage B, a plan P of the type shown in FIG. 13 is obtained. This plan 13 is composed of two subplans $SP_1$ and $SP_2$. The supplementary MTS's are connected in such a way that their outputs are in parallel with the outputs of the MTS's of stage B of the sub-plan, of which they are part, whilst their inputs are in parallel with the inputs of stage B of the other sub-plan. This corresponds in fact to conventional multiples that are used in the spatial networks. In the embodiment referred to above, such multiples may be obtained by connectors arranged on the front surface of the cards, which gives a standard rack holder wired in exactly the same way for the entire range of the connection networks according to the invention.

Accordingly, this structure is essentially extendible. In another example of a connection network according to the invention, there are 192 STM's at the input end and 192 STM's at the output end, so that it is possible to switch 1344 PCM junctions corresponding to a traffic of approximately 15,000 Erlangs. Accordingly, like the structure of the two preceding examples, this structure serves seven junctions at the input of each input MTS and seven junctions at the output of each output MTS in the interests of safety. In this case, too, there are eight connection plans each organised into three stages A, B and C.

Figure 14:
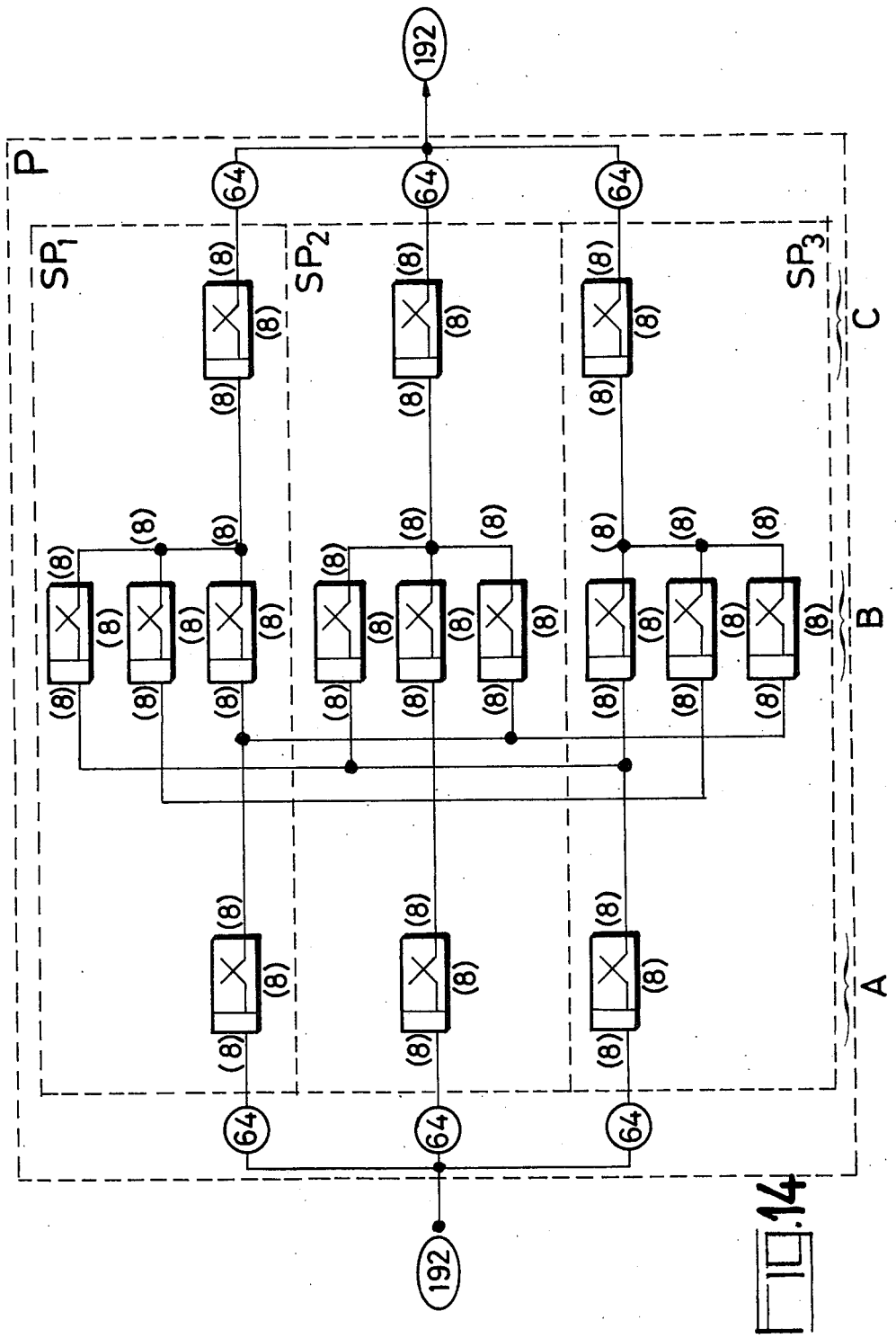
FIG. 14 represents, with the symbols used in FIG. 12, a network designed for a traffic of about 15,000 Erlangs.

For the same reasons as in the second example, it is necessary to modify the composition of the plans, which is done in the same way by using three sub-plans $SP_1$, $SP_2$ and $SP_3$, as shown in FIG. 14. These sub-plans are obtained from the basic plan of the 5000 Erlangs network by adding 16 MTS's in the central stage B. These additional STM's are multiplied in the same way as before between the outputs of stage B of the plan to which they belong and the inputs of stages B of the other two sub-plans. In this way, it is possible to use the same technology as in the two previously described examples.

It has thus been shown that it is possible to construct an automatic exchange extendible over a very wide range using only a single base chassis. Extension is effected without any wiring other than the connection of the PCM junctions. After these junctions have been connected, it is sufficient to place printed circuit cards containing the input and output STM's in this chassis, to replace the printed circuit cards forming the switching plans by those intended for the desired network and to connect the connectors of these cards intended for the multipling of the stages B.

It should be pointed out that the structure in the form of 8 separate plans thus defined is closely associated with the structure of the MTS's which is itself dependent to a large extent upon the coding of the speech samples from 8 bits, this number enabling an MTS with eight inputs and eight outputs to be readily produced. Naturally, the scope of the invention is not in any way limited by these numbers which could in particular be different for another coding.

In addition, it is possible to reduce the capacity of the automatic exchange rather than increasing it whilst retaining the same basis chassis. Thus, a connection network according to the invention serving 112 PCM junctions, corresponding to a traffic of approximately 1000 Erlangs, will comprise 16 MTS's at its input end and 16 MTS's at its output end. In this case, it is no longer necessary to use 3 stages in series in the connection plans, because a non-blocking network may be directly obtained, the number of inputs and outputs being sufficiently small for the $n_2$ law not to lead to an excessive number of circuits.

Figure 15:
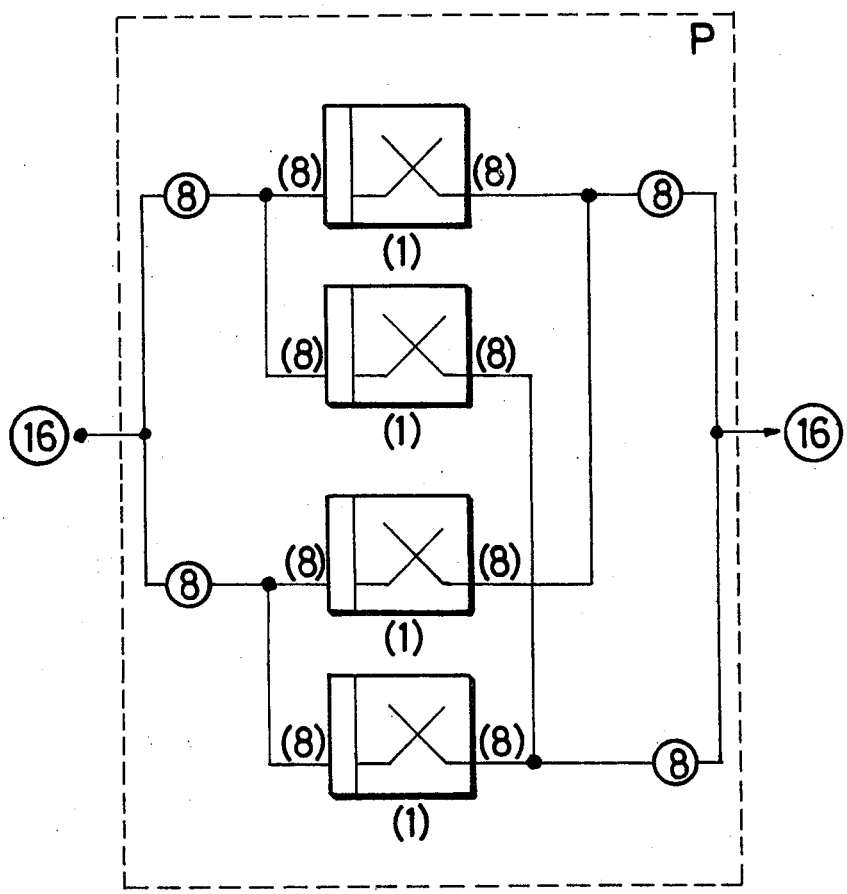
FIG. 15 represents, with the symbols used in FIG. 12, a network designed for a traffic of about 1250 Erlangs.
Figure 16:
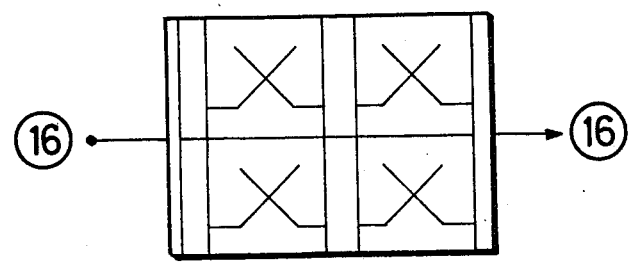
FIG. 16 represents, with an extension of the symbolism used in FIG. 12, the plan represented in FIG. 15.

The network of the switching plans P will in this case be that illustrated in FIG. 15 which shows a square matrix of order 4 obtained by multipling 4 elemental square matrixes. Since this technique of multipling is well known, it is simpler to represent this network in the symbolic form of FIG. 16 where the 4 elemental matrices are shown assembled in square form without the connections being shown.

In this case, the control unit (not shown in the Fig.) which fixes the routes within each plan is extremely simplified because there is no longer any need properly speaking to search for a route, but merely to fix it. In relation to the ordinary spatial networks, these routes are of course modified according to a cycle of 32 successive configurations every $1/8000^{th}$ of a second on account of the time-division switching due to the use of the MTS's.

Figure 17:
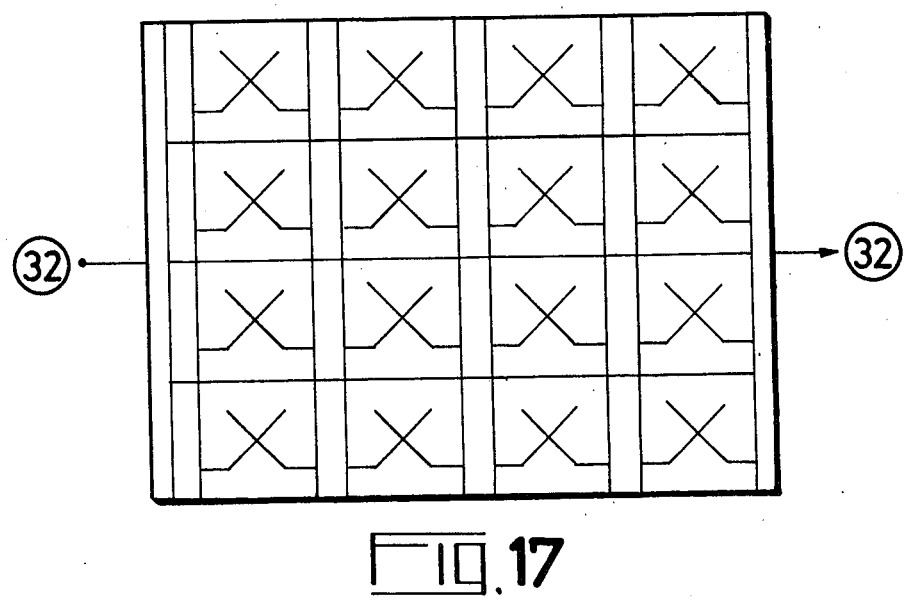
FIG. 17 represents, with the symbols used in FIG. 16, a network designed for a traffic of about 2500 Erlangs.

In a last example, a connection network according to the invention, of an intermediate size and intended to serve 224 PCM junctions (i.e. a traffic of approximately 2500 Erlangs), will comprise 32 MTS's at its input end and 32 MTS's at its output end. In this case, too, it is possible to use a switching network without blocking in the plans P. This network is shown in the symbolic manner defined above in FIG. 17 where the square structure composed of 16 MTS's multiplied with one another is clearly visible. Similarly, the control unit (not shown in the Fig.) will be highly simplified.

The following documents have been quoted during the French rosecution:

French patent NR 2 265 240 (C.G.C.T. - L.M.T.);
French patent NR 2 091 328 (Plessey);
French patent NR 2 170 405 (The Post Office);
French Patent NR 2 212 055 (C.G.C.T. - L.M.T.);
US paper "The Bell System Technical Journal", vol. 52, NR 6, july/august 1973, article from KRUPP et TOMKO "Schwitching Networks of Planar Shifting Arrays".

What we claim is:

1. A symmetrical time-division matrix for switching input time-slots of a first set of input series PCM junctions towards output time-slots of a second set of output series PCM junctions, said matrix comprising:

parallelizing means for receiving simultaneously in serial form said input time-slots from said input series PCM junctions and delivering successively in parallel form said input time-slots;

time-division switching means for receiving said input time-slots from said parallelizing means according to a first order, switching said input time-slots into said output time-slots according to a second order, and delivering successively in parallel form said output time-slots according to said second order; and serializing means for receiving from said timedivision switching means said output time-slots, for selecting an output series PCM junction for a time-slot based solely on the position of said time-slot in the succession of output time-slots, and for delivering simultaneously in serial form said output time-slots to said output series PCM junctions.

2. A matrix as claimed in claim 1, further comprising a counter for providing to said parallelizing means signals for controlling said delivering of the input time slots, and providing to said time division switching means signals for controlling said memorizing according to a first order.

3. A matrix as claimed in claim 2, thurther comprising a counter for providing to said time divison switching means signals for controlling said delivering according to a second order, and providing to said serializing means signals for controlling said delivering of the output time slots.

4. A matrix as claimed in claim 3, further comprising means for modifying said second order under the control of an external signal between the delivering of two successive of said output time-slots.

5. A matrix as claimed in claim 1, wherein said first set comprises eight input junctions, said second set comprises eight output junctions; said input and output junctions comprising 32 time-slots coded over 8 bits.

6. A time-division network for switching at least one input time-slot of one of $m \times n$ input PCM series junctions to one output time-slot of one of $m \times n$ output PCM series junctions, said network comprising:

an input stage comprising a symmetrical time-division matrices, each of said matrices having one free input, $n$ other inputs connected to $n$ of said input connections, and $n+1$ outputs;

an intermediate stage divided into $n + 1$ separate pluralities of symmetrical time-division matrices, each of said pluralities substantially forming a plan, and each of said plans being connected to one output of each of said matrices of the input stage; the symmetrical time-division matrices of each of said plans being interconnected for relating at least one input of said plan to one output of said plan;

an output stage comprising m symmetrical time-division matrices, each of said matrices having $n+1$ inputs, one free output, and n other outputs connected to n of said output junctions; and each of said plans being connected to one input of each of said matrices of the output stage; and control means for fixing at least one route between one of said input junctions and one of said output junctions.

7. A network as claimed in claim 6, wherein said control means comprise:
   a central unit for fixing a first part of said route between said one input junction and one of said plans, and a third part of said route between said one plan and said one output junction; and
   $n+1$ separate control circuits connected to respectively each of said plans; the separate control circuit connected to said one plan fixing under the control of said central unit, a second part of said route between said first and third part.

8. A network as claimed in claim 7, wherein said PCM junctions comprises 32 channels coded from 8 bits, and said symmetrical time-division matrices have $n+1 = 8$ inputs and $n+1 = 8$ outputs.

9. A network as claimed in claim 8, wherein each of said plans is divided into three successive interconnected switching sub-stages.

10. A network as claimed in claim 9, wherein the number $m$ is equal to 64, and each of said successive sub-stages comprises 8 symmetrical time-divided matrices.

11. A network as claimed in claim 8, wherein each of said plans is divided into two parallel sub-plans, each of said sub-plans being divided into a first, a medium, and a third interconnected switching sub-stages; and the medium sub-stages of two sub-plans of one plan being interconnected.

12. A networkk as claimed in claim 11, wherein the number $m$ is equal to 128; the first and the third sub-stages of each sub-plan comprising respectively eight symmetrical time-division matrices, and the medium sub-stage of each sub-plan comprising 16 symmetrical time-division matrices.

13. A network as claimed in claim 8, wherein each of said plans comprises a sub-network composed of symmetrical time-division matrices interconnected for forming a square matrix without blocking.

14. A network as claimed in claim 13, wherein the number $m$ is 32, and each sub-network comprises 16 symmetrical time-division matrices.

15. A network as claimed in claim 13, wherein the number $m$ is equal to 16, and each sub network comprises 4 symmetrical time-division matrices.

* * * * *